(12) United States Patent
Elmore et al.

(10) Patent No.: US 8,132,456 B2
(45) Date of Patent: Mar. 13, 2012

(54) FUEL LEVEL INDICATOR FOR RIDING LAWN EQUIPMENT

(75) Inventors: Sean P. Elmore, Fort Mill, SC (US); Robert G. Frederick, Waxhaw, NC (US); Lynville G. Johnson, Rock Hill, SC (US)

(73) Assignee: Deere & Company, Moline, IL (US)

( * ) Notice: Subject to any disclaimer, the term of this patent is extended or adjusted under 35 U.S.C. 154(b) by 402 days.

(21) Appl. No.: 12/435,732

(22) Filed: May 5, 2009

(65) Prior Publication Data

US 2010/0281973 A1 Nov. 11, 2010

(51) Int. Cl.
*G01F 23/20* (2006.01)
(52) U.S. Cl. .................... 73/296; 73/290 B
(58) Field of Classification Search ........... 73/290 B, 73/290 R, 290 V, 291–334
See application file for complete search history.

(56) References Cited

U.S. PATENT DOCUMENTS

| | | | |
|---|---|---|---|
| 1,730,173 A | 10/1929 | Stearns | |
| 2,040,357 A | 5/1936 | Chalatow | |
| 2,330,857 A * | 10/1943 | Alcott | 177/45 |
| 4,063,605 A * | 12/1977 | Graham | 177/225 |
| 4,245,505 A * | 1/1981 | Baynes | 73/296 |
| 4,319,651 A * | 3/1982 | Robichaud | 177/229 |
| 4,382,478 A * | 5/1983 | Hearn | 177/169 |
| 4,413,515 A * | 11/1983 | Quinn | 73/296 |
| 4,811,596 A | 3/1989 | Wolfgang | |
| 5,056,364 A * | 10/1991 | Kahler et al. | 73/296 |
| 5,186,159 A * | 2/1993 | Crow et al. | 126/41 R |
| 5,203,799 A * | 4/1993 | Wineman | 177/246 |
| 5,367,861 A * | 11/1994 | Murakawa et al. | 56/11.8 |
| 5,555,764 A * | 9/1996 | Dybas | 73/296 |
| 5,850,757 A * | 12/1998 | Wierenga | 73/296 |
| D408,421 S * | 4/1999 | Beal, Jr. | D15/17 |
| 6,148,668 A * | 11/2000 | Sieg | 73/296 |
| 6,170,242 B1 * | 1/2001 | Gordon | 56/15.8 |
| 6,284,987 B1 * | 9/2001 | Al-Modiny | 177/170 |
| 6,410,864 B1 * | 6/2002 | Kim | 177/148 |
| 6,454,032 B1 * | 9/2002 | Teal et al. | 180/6.62 |
| 6,935,093 B2 * | 8/2005 | Velke et al. | 56/15.2 |
| 6,968,805 B1 * | 11/2005 | Rathbun | 116/227 |
| 6,978,671 B1 | 12/2005 | Meggs et al. | |
| 7,267,001 B1 * | 9/2007 | Stein | 73/296 |
| 7,775,311 B1 * | 8/2010 | Hardy et al. | 180/68.5 |
| 7,918,305 B2 * | 4/2011 | Scherbring et al. | 180/408 |
| 2001/0032504 A1 * | 10/2001 | Moseley | 73/29 R |
| 2008/0029519 A1 * | 2/2008 | Sommer et al. | 220/562 |

FOREIGN PATENT DOCUMENTS

| | | |
|---|---|---|
| GB | 2020045 | 11/1979 |
| JP | 63-87316 | 4/1988 |
| JP | 7-83732 | 3/1995 |
| JP | 2005-9939 | 1/2005 |

\* cited by examiner

*Primary Examiner* — David Rogers

(57) ABSTRACT

A fuel level indicator for riding lawn equipment with a fuel tank pivotably mounted under the operator seat. A fuel level indicator arm is pivotably mounted under the fuel tank and has a first end contacting the fuel tank and a second end extending through an opening in front of the operator seat. A scale on the opening indicates the fuel level corresponding to the location of the second end of the fuel level indicator arm. A pair of tension springs are attached to the fuel tank and partially support the fuel tank.

10 Claims, 2 Drawing Sheets ated by the fuel level indicator arm extending from under a fuel tank to a position which may be visible to a seated operator.

FUEL LEVEL INDICATOR FOR RIDING LAWN EQUIPMENT

FIELD OF THE INVENTION

This invention relates to fuel level indicators for riding lawn equipment, and specifically to fuel level indicators that are external to the fuel tank.

BACKGROUND OF THE INVENTION

Fuel level indicators for riding lawn equipment may include a fuel level sight window that is visible to a seated operator. These fuel tanks may be made from translucent plastic material that is sufficiently transparent so that operators can easily check the fuel level by looking through a sight gauge on the tank.

Environmental concerns have resulted in lower permeation requirements for riding lawn equipment fuel tanks. The lower permeation requirements may require processes and materials for fuel tanks other than translucent plastic. For example, the fuel tank material may be opaque so that fuel level is not visible through the wall of the tank.

Other fuel level indicators for riding lawn equipment include various float sensors inside the fuel tank, and electronic fuel sensors. However, to indicate the fuel level with reasonable accuracy, these types of sensors can be prohibitively expensive. A cost effective and reasonably accurate fuel level indicator is needed for riding lawn equipment.

SUMMARY OF THE INVENTION

A fuel level indicator is provided for riding lawn equipment with a fuel tank pivotably positioned under an operator seat and between a pair of vertically aligned plates. A pivotable fuel level indicator arm has a first end contacting the underside of the tank and a second end extending from the underside of the tank around the front of the tank. A pair of springs are in tension between the tank and the plates, to partially support the tank. The second end of the fuel level indicator arm extends through an opening in front of the operator seat, which has markings to show the fuel level corresponding to the location of the second end of the arm. The pivot axis for the fuel level indicator arm is mounted under the operator seat.

The fuel level indicator may be used to indicate the fuel level of tanks that are opaque so that fuel level is not visible through the wall of the tank. The fuel level indicator has reasonable accuracy and is cost effective for riding lawn equipment.

DESCRIPTION OF THE PREFERRED EMBODIMENT

Figure 1:
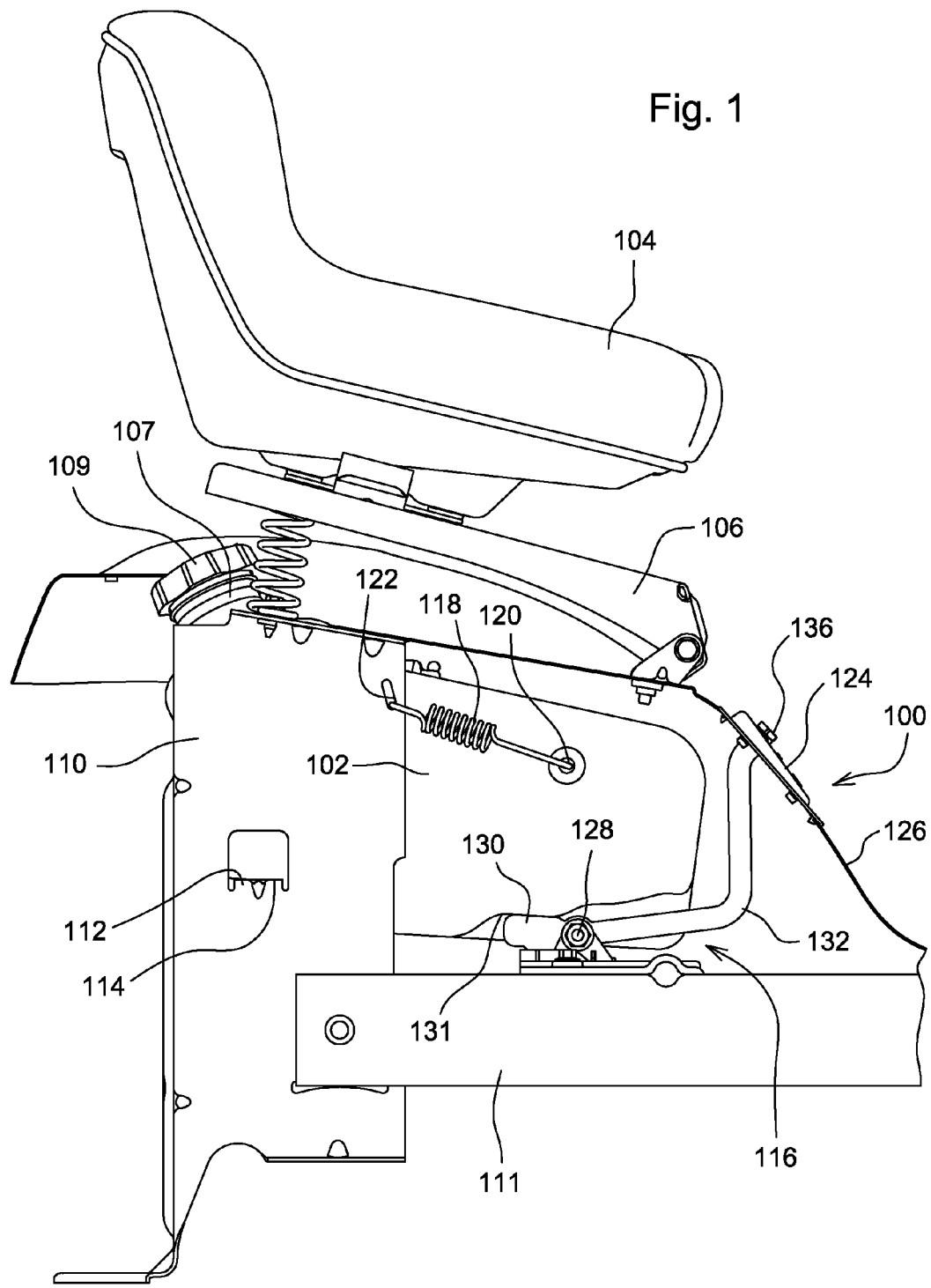
FIG. 1 is a side view of a fuel level indicator for riding lawn equipment in a tank full position according to a first embodiment of the invention.
Figure 2:
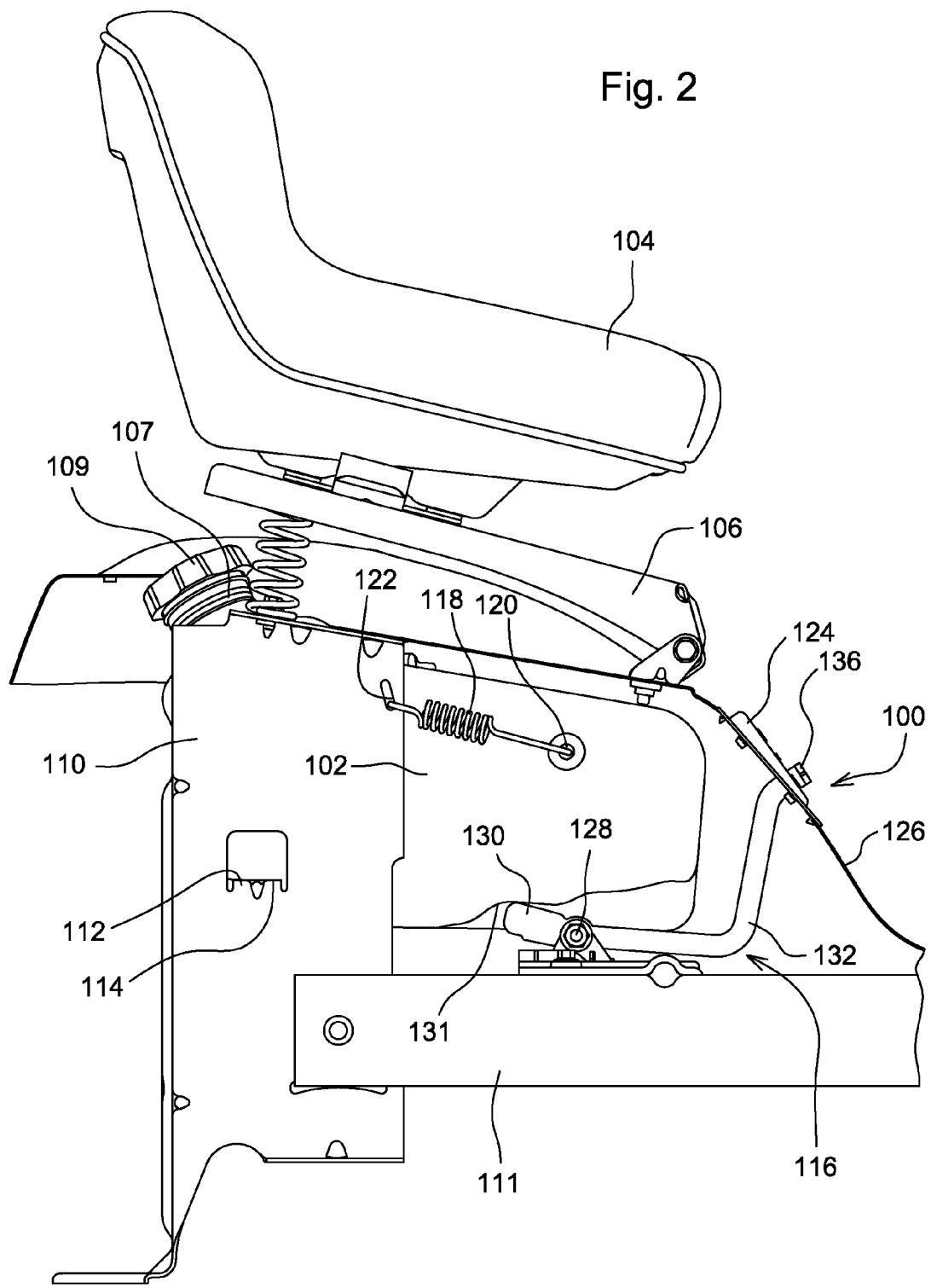
FIG. 2 is a side view of a fuel level indicator for riding lawn equipment in a tank empty position according to a first embodiment of the invention.

In a first embodiment of the invention shown in FIGS. 1-2, fuel level indicator 100 is provided for a lawn and garden tractor which is one example of riding lawn equipment where the invention may be useful. The lawn and garden tractor is powered by an internal combustion engine that requires a fuel supply from fuel tank 102.

In one embodiment, the fuel tank may be positioned below operator seat 104, which is pivotally mounted on platform 106. The longest dimension of the fuel tank preferably extends from under the front of the seat horizontally to under the rear of the seat, which may be between about 12 inches and about 24 inches. The smallest dimension of the fuel tank may be a vertical, preferably between about 3 inches and about 6 inches. The fuel tank may have an underside that is at least partially in a generally horizontal plane, and a top surface with a fill opening 107 covered by a removable cap 109 that is under the seat and/or to the rear of the seat.

In one embodiment, the fuel tank may be positioned between a pair of vertically aligned side plates 110 mounted to frame 111 of the lawn and garden tractor. Each side plate 110 may have a rear tank mount which may be an upwardly projecting post or tab 112 that loosely fits into a pocket or indentation 114 molded into the side of the fuel tank. At least part of the weight or mass of the fuel tank may be supported by the rear tank mounts on each side of the fuel tank, without holding the fuel tank rigidly between the side plates.

In one embodiment, fuel tank 102 may be partially supported in front by a pair of springs 118. Each spring provides a tension spring force between a spring hole 120 molded into or attached to a side surface of the fuel tank, and a slot or hole 122 in side plate 110. Additionally, the front of the fuel tank may rest on fuel indicator arm 116. The fuel indicator arm may be a plastic or metal arm that is pivotably attached to pivot axis 128 mounted on frame 111 of the riding lawn equipment.

In one embodiment, the changing fuel weight in the tank, due to fuel consumed during use, along with the spring force, will cause the front of the fuel tank to move up and down vertically, pivoting around the rear tank mounts. This vertical motion of the fuel tank will rotate fuel level indicator arm 116 on pivot axis 128.

In one embodiment, the first end 130 of fuel level indicator arm 116 is positioned below the underside 131 of the fuel tank and has a length of less than about five inches from pivot axis 128 under the tank. The first end of the fuel indicator arm contacts the underside 131 of the fuel tank. If the fuel tank is full, the weight of the fuel pushes the first end 130 downwardly into contact with the pivot bracket or another surface adjacent the pivot axis, located under the fuel tank and at or above the vehicle frame. Thus, the first end of the fuel indicator arm, on the pivot axis, provides support for the front end of the fuel tank. As the fuel tank empties, the fuel tank has less weight and the tension of the pair of springs urge the front of the fuel tank up, causing the first end of the fuel level indicator arm to pivot upwardly on the pivot axis.

In one embodiment, the second end 132 of fuel level indicator arm 116 is L-shaped and extends from pivot axis 128 underneath and around the front of the tank, and through opening 134 in fender 126 or the body of the vehicle below the front of the operator seat. Alternatively, the second end of the fuel level indicator arm may be J-shaped or U-shaped, so that it extends from the underside of the fuel tank to the front of the fuel tank. The second end of the fuel level indicator arm may extend through the opening in fender 126 or the body of the riding lawn equipment at an angle of between about 30 degrees and about 60 degrees from horizontal. Scale 124 may be mounted or applied onto the opening and may include markings indicating the level of fuel in the tank, such as "full", "empty", or some fraction thereof. The second end of the fuel level indicator may include a pointer 136 which provides operator feedback by pointing to the current fuel level marked on the scale.

In one embodiment, the second end of the fuel level indicator should be substantially longer than the first end, and preferably measures at least about ten inches in length from the pivot axis to the pointer. The second end may wrap around the fuel tank from the underside of the tank to the front of the tank. If the tank is full, the tank pushes down the first end of the fuel level indicator, causing the second end of the fuel level indicator to pivot up until the pointer reaches the top of the scale that may be marked "full". As the tank empties and decreases in fuel volume and weight, the first end of the fuel level indicator can pivot up, while the second end pivots down so that the pointer moves toward the bottom of the scale showing an "empty" marking.

Having described a preferred embodiment, it will become apparent that various modifications can be made without departing from the scope of the invention as defined in the accompanying claims.

The invention claimed is:

1. A fuel level indicator for riding lawn equipment, comprising:
   a fuel tank positioned below an operator seat, the fuel tank having a longest dimension extending from under the front of the seat horizontally to under the rear of the seat; and
   a fuel level indicator arm on a pivot axis, a first end of the fuel indicator arm contacting the underside of the fuel tank, and a second end of the fuel level indicator arm extending from the pivot axis underneath and around the tank, and through an opening under the front of the seat marked with a scale so that the second end of the fuel level indicator arm indicates the fuel level; and
   a pair of springs attached to the sides of the fuel tank and providing tension force urging the front of the fuel tank up.

2. The fuel level indicator of claim 1 wherein the second end of the fuel level indicator arm is L-shaped.

3. The fuel level indicator of claim 1 further comprising a pair of upwardly projecting posts supporting a slot in the side of the tank and pivotably supporting the rear of the tank.

4. A fuel level indicator for riding lawn equipment, comprising:
   a fuel tank pivotably positioned under an operator seat and between a pair of vertically aligned plates;
   a pivotable fuel level indicator arm having a first end contacting the underside of the tank and a second end extending from the underside of the tank around the front of the tank;
   a pair of springs in tension between the tank and the plates and partially supporting the tank; and
   an opening through which the second end of the pivotable fuel level indicator arm extends, the opening being in front of the operator seat and having markings showing the fuel level corresponding to the location of the second end of the pivotable fuel indicator arm.

5. The fuel level indicator of claim 4 further comprising a pivot axis for the pivotable fuel level indicator arm mounted under the operator seat.

6. The fuel level indicator of claim 4 wherein the second end of the pivotable fuel level indicator arm is L-shaped.

7. The fuel level indicator of claim 4 further comprising a pair of tank mounts between the pair of plates and the fuel tank.

8. A fuel level indicator for riding lawn equipment, comprising:
   a frame having an operator seat pivotably mounted thereto;
   a fuel tank pivotably mounted under the operator seat and having a fill opening in an upper surface thereof;
   a fuel level indicator arm pivotably mounted under the fuel tank and having a first end contacting the fuel tank and a second end extending through an opening in front of the operator seat;
   a scale on the opening indicating the fuel level corresponding to the location of the second of the fuel level indicator arm; and
   a tension spring attached to the fuel tank and partially supporting the fuel tank.

9. The fuel level indicator of claim 8 wherein the fuel level indicator arm is L-shaped.

10. The fuel level indicator of claim 9 wherein the fuel tank is pivotably mounted between a pair of vertical plates.

\* \* \* \* \*